United States Patent [19]
Van Der Broeck et al.

[11] Patent Number: 5,793,182
[45] Date of Patent: Aug. 11, 1998

[54] CIRCUIT ARRANGEMENT FOR POWERING A LOAD

[75] Inventors: Heinz Van Der Broeck, Zülpich; Matthias Wendt, Würselen, both of Germany

[73] Assignee: U.S. Philips Corporation, New York, N.Y.

[21] Appl. No.: 648,946

[22] Filed: May 16, 1996

[30] Foreign Application Priority Data

May 26, 1995 [DE] Germany ............... 195 19 369.5

[51] Int. Cl.⁶ .......................................... H02P 5/11
[52] U.S. Cl. ................. 318/811; 318/254; 318/802; 363/41
[58] Field of Search ................. 318/798–815, 318/254; 363/27–28, 37–43

[56] References Cited

U.S. PATENT DOCUMENTS

| | | | |
|---|---|---|---|
| 4,364,109 | 12/1982 | Okado et al. | 363/41 |
| 4,602,201 | 7/1986 | Edwards | 318/811 |
| 4,626,763 | 12/1986 | Edwards | 318/811 |
| 4,763,060 | 8/1988 | Takahashi | 318/811 |
| 4,962,976 | 10/1990 | Takahashi et al. | 318/811 |
| 5,053,690 | 10/1991 | Mutoh et al. | 318/811 |
| 5,280,419 | 1/1994 | Amler | 363/37 |
| 5,552,977 | 9/1996 | Xu et al. | 363/41 |
| 5,581,452 | 12/1996 | Yamamoto | 363/41 |

*Primary Examiner*—David S. Martin
*Attorney, Agent, or Firm*—Edward Blocker

[57] ABSTRACT

A circuit arrangement for powering a load having n terminals includes n branches. One of the terminals of the load is switchably connected to a first or a second terminal of a voltage source by each of the branches resulting in a voltage vector having n components being applied to the load. The vector components can each assume two values based on the voltage of the voltage source. A control circuit sets the n components of the voltage vector to one of the two values. When all n components assume the same value within some portion of a given period of time (referred to as null vector) and provided that at least one of the components of the voltage vector during this given period of time reamins at this same value, the control circuit sets all components of the voltage vector to the other value so as to form a second null vector.

The circuit arrangement prevents a voltage on a terminal of the load from being sustained at a given voltage beyond a given period of time without corrective action being taken.

12 Claims, 3 Drawing Sheets

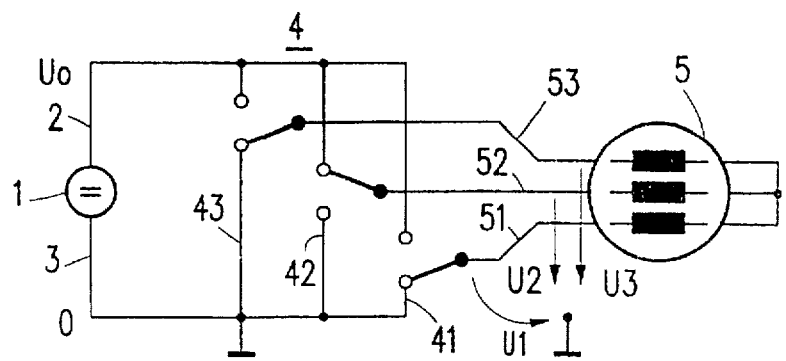
FIG. 1
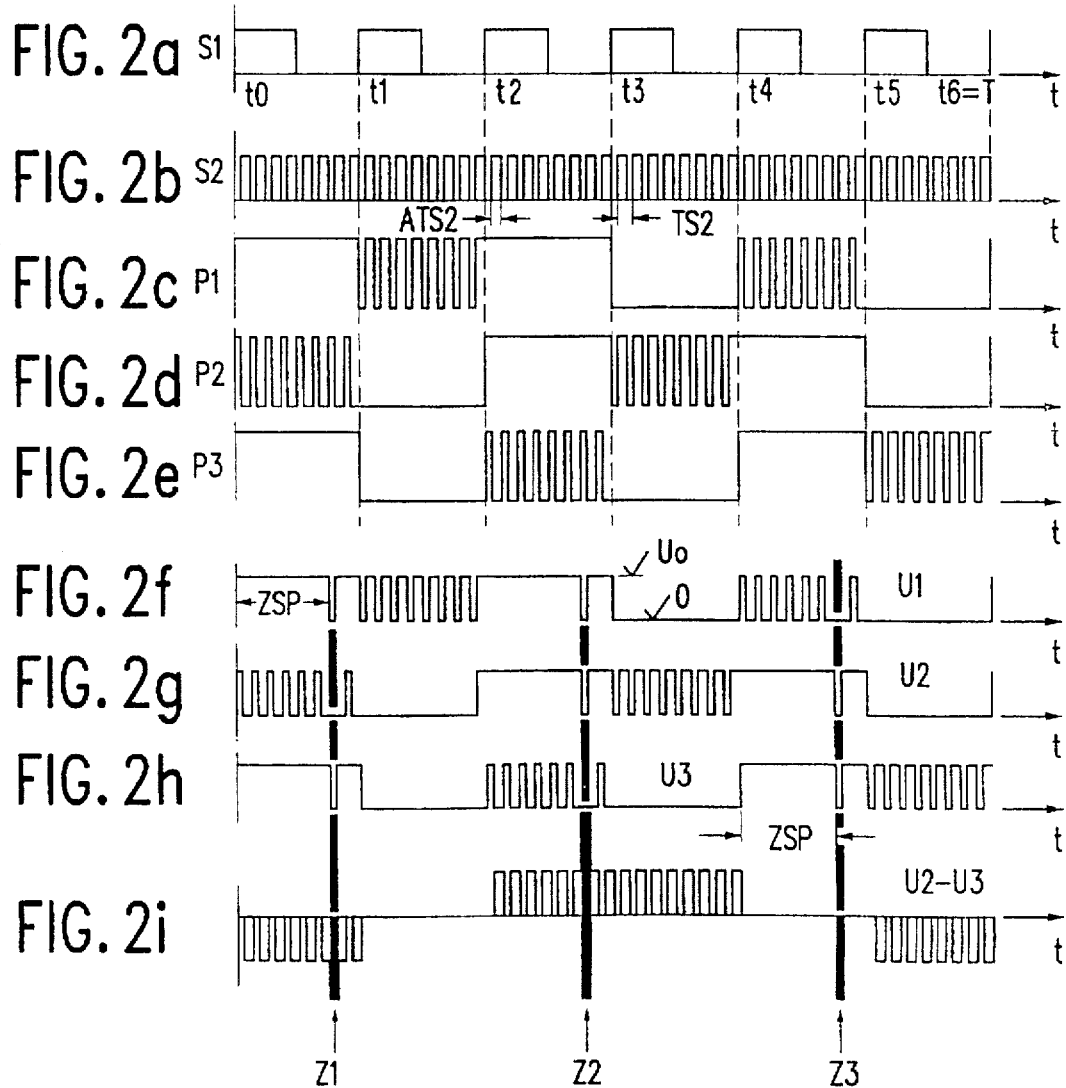

5,793,182

1

CIRCUIT ARRANGEMENT FOR POWERING A LOAD

BACKGROUND OF THE INVENTION

The invention relates to a circuit arrangement for powering a load.

U.S. Pat. No. 4,626,763 describes a motor control arrangement for controlling the speed of a motor as a function of a rectangular signal of variable frequency and of chopper pulses. In this arrangement a three-phase motor is energized with rectangular voltages formed by a rectangular wave having a fundamental frequency corresponding to the motor speed and superposed pulses of variable width. These rectangular voltages are derived from a first rectangular signal whose frequency corresponds to six times the frequency or speed of rotation of the motor and from a second signal whose frequency is high relative to the frequency of the first signal. The resulting voltages then have continuously constant values in some of the time intervals between each time two pulses of the first signal and vary as high-frequency rectangular pulses in other ones of these time intervals.

A similar arrangement with corresponding variations as a function of time of the voltages across the phases of a three-phase motor is also disclosed in U.S. Pat. No. 4,602,201.

In the circuit arrangements disclosed in said documents the frequency of the first signal determines the speed of the three-phase motors being driven. The frequency of the first signal is therefore varied in accordance with the desired or prevailing speed of the motor. For low speeds this results in low frequencies of the first signal and, consequently, large time intervals between the pulses forming this signal. Likewise, the individual voltages across the motor phases have large time intervals with a constant voltage value. However, it may be desirable to reduce these time intervals, in which the motor operation is not influenced, without the speed being influenced.

From GB-OS 2,142,194 it is known, in order to change the harmonic content of the supply voltages for a three-phase asynchronous motor and, particularly, in order to reduce the negative effects of lower-order harmonics at low speeds, to apply pulse modulations at the beginning and towards the end of each halfcycle of the rectangular supply voltage and, in addition, to apply voltage chopping in the middle of the pulses of the rectangular voltages. This results not only in an overall reduction of the constant-voltage intervals in the rectangular supply voltages of the three-phase motor but also in a change of the overall voltage waveforms.

However, when a load is powered by means of a circuit arrangement comprising a power inverter the situation may occur that under given operating conditions a constant voltage of given polarity is applied to a terminal of the load beyond a given period of time. If it is then desired to restrict the supply of this constant voltage of given polarity to said time interval a variation of the voltage value will result the voltage waveform to be applied to the load being changed in an undesirable manner. For example, at a low enough speed of a three-phase motor to be powered a voltage variation will occur which deviates to an uncontrolled extent from that at higher speeds. Particularly if the voltage variation for the high speeds has been dimensioned for optimum operating conditions of the motor, for example in order to minimize the content of undesirable harmonic waves or in order to reduce unwanted transient effects, these optimum operating conditions may be disturbed severely at low speeds.

2

SUMMARY OF THE INVENTION

It is an object of the invention to provide a circuit arrangement for powering a load which under all operating conditions prevents a voltage on a terminal of the load from being sustained at a given voltage value beyond a given period of time, without the operation being impaired.

According to the invention this object is achieved by means of a circuit arrangement for powering a load having a number of n terminals via a power inverter comprising a number of n branches, in which one of the terminals of the load is optionally connectable to a first or a second terminal of a voltage source by each of the branches, as a result of which a voltage vector having a number of n components is applied to the load, which components can each assume two values constituted by the voltage values produced by the voltage source on the terminals of this source, which arrangement comprises a control circuit by means of which the n components of the voltage vector can be set to the two possible values in a given time sequence, so that the voltage vector complies with a given function of time in which all n components assume the same value (referred to as null vector) in regularly recurring time intervals, the next null vector, in the case that at least one of the components of the voltage vector assumes exclusively a first one of the two values for a given period of time, being formed with the second one of the two values.

The circuit arrangement in accordance with the invention can be used universally for polyphase loads of a wide variety of kinds. It is particularly suitable for the power supply of variable-speed polyphase drives. The most important requirement is then that a null vector recurs at regular time intervals. This means that all components of the voltage vector, i.e. all the voltages appearing on the load terminals, assume the same value. In the time intervals in which this condition occurs the load is thus short-circuited with respect to all its terminals. In that case it is irrelevant via which of the supply source terminals this short-circuit is produced. Consequently, it may be produced via the desired supply source terminal, i.e. via the desired one of the two values of the components of the voltage vector. For all the components of the voltage vector it is thus possible to effectively limit the time interval during which it can exclusively assume one of the two values, without the operation of the load being affected thereby. In particular, it does not give rise to any undesired harmonics or transient effects.

A preferred use of the invention is obtained if at least some of the n components of the voltage vector are temporarily pulse-width modulated as a function of time. At least the individual pulses of this function then form regularly recurring time intervals, in which preferably null vectors occur. A particularly suitable field of use is obtained in the case that not all of the n components of the voltage vector are pulse-width modulated, in which case at option some components may be pulse-width modulated predominantly or continuously and other components may be pulse-width modulated to a small extent or not at all but, as an alternative, all the components in succession may be pulse-width modulated alternately in a given sequence in given periods of time but may be constant in the other periods of time. This results in a very broad field of use for the circuit arrangement in accordance with the invention because it is possible to use a variety of different variants for powering the load in accordance with the invention.

In an advantageous case in which the circuit arrangement in accordance with the invention is used, the first terminal of the voltage source essentially carries a high voltage value as the first one of the two values of the components and the second terminal of the voltage source carries ground potential as the second one of the two values of the components. This selection of the voltage values is particularly suitable for an embodiment of the circuit arrangement in accordance with the invention, which is characterized in that each branch of the power inverter includes two semiconductor switches, of which a first one is disposed between the first terminal of the voltage source and the associated terminal of the load and of which a second one is disposed between the associated terminal of the load and the second terminal of the voltage source, there has been provided a driver circuit for each for each semiconductor switch, and the driver circuits of one branch of the power inverter are powered from a common drive supply voltage source, to which the (first) driver circuit of the first semiconductor switch is connected via a diode and the (second) driver circuit of the second semiconductor switch is connected directly. This arrangement is of very simple construction and is therefore favorable for use in mass products. The invention then makes it possible to obtain an efficient and reliable drive using very cheap means.

BRIEF DESCRIPTION OF THE DRAWINGS

Embodiments of the invention, given by way of example, are shown in the drawings, in which FIG. 1 shows the basic circuit diagram of a three-phase motor powered by means of a direct voltage source, FIG. 2 shows some signal waveforms relating to FIG. 1.

DETAILED DESCRIPTION OF THE PREFERRED EMBODIMENT

Figure 3:
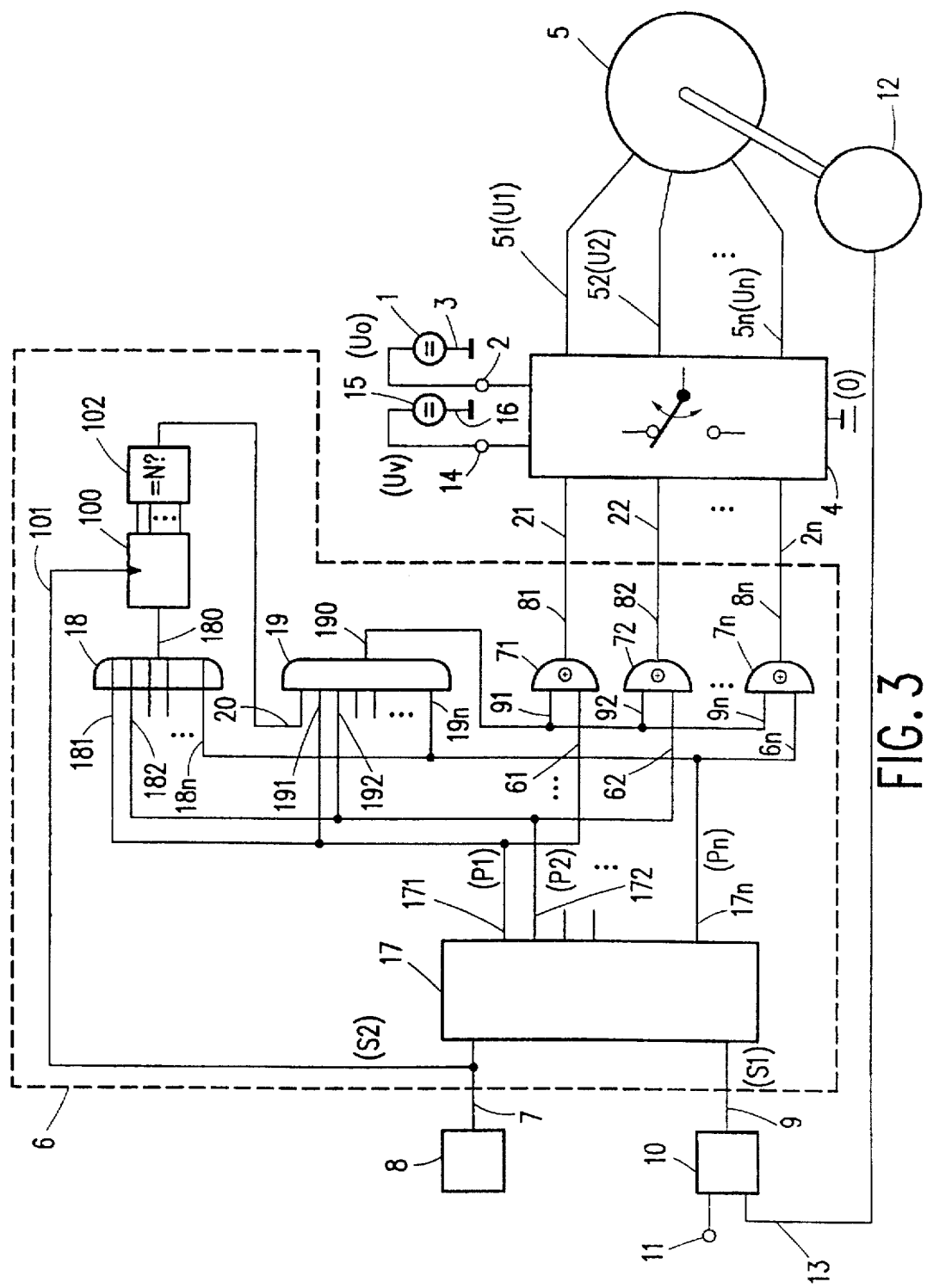
FIG. 3 shows an example of an embodiment.

In FIG. 1 the reference numeral 1 refers to a voltage source having a first terminal 2 and second terminal 3. In principle, the voltage source carries a direct voltage of a magnitude Uo between its terminals 2, 3. The second terminal 3 is connected to ground and is therefore at ground potential 0. The first terminal of the voltage source 1 is consequently at a high voltage value Uo.

FIG. 1 further shows diagrammatically a power inverter 4 and a motor forming a load 5. The load 5 has a number of n=3 terminals 51, 52 and 53, each connected to an associated branch 41, 42 or 43 of the power inverter 4. By each of the branches 41, 42 and 43 the associated terminal 51, 52 or 53 of the load 5 can be connected optionally to the first terminal 2 or the second terminal 3 of the voltage source 1. In FIG. 1 the branches 41, 42, 34 of the power inverter 4 are therefore each shown diagrammatically as a switch. Voltages U1, U2 and U3 are applied to the respective terminals 51, 52 and 53 of the load 5 via the branches 41, 42, 43 of the power inverter 4. These voltages U1, U2, U3 represent a voltage vector, which in a generalized form comprises a plurality of components, in general terms n components U1, U2, U3, . . . , Un. These components can each assume two different values, formed by the voltage values Uo and 0 produced by the voltage source 1 on its terminals 2, 3. The switches in the branches 41, 42, 43—in general up to 4n—can be set in such a manner by a control circuit, not shown in FIG. 1, that given voltage vectors can be applied to the load 5 in a given time sequence, i.e. the n components of the voltage vector can be set to their two possible values 0 and Uo in this given time sequence. Thus, the voltage vector is a given function of time.

FIG. 2 shows a series of diagram of signal waveforms for powering the load 5 in FIG. 1. These signal waveforms can be processed or generated by means of the above-mentioned control circuit. An example of such a circuit can be found in the U.S. Pat. Nos. 4,626,763 and 4,602,201 mentioned in the introductory part, which are herewith incorporated by reference. Therefore, the description of the present embodiment does not include a detailed description of the construction and operation of such a control circuit.

The control of the motor forming the load 5 is based on a rectangular signal as shown in FIG. 2a) and having a frequency corresponding to six times the revolution frequency (in the simplest case) of the motor. This first signal S1, which defines the revolution frequency of the motor 5, divides one revolution period T of the motor 5 into six equal time intervals, which start at the rising edges of the first signal S1, which edges correspond to the instants t0 to t5; the instant t6 corresponds to the end of a revolution period T. In the diagrams shown in FIG. 2 the letter t indicates the time axis.

FIG. 2b) shows the variation in time of a second signal S2, which is also rectangular and whose frequency is high relative to the frequency of the first signal S1. TS2 is a period of the second signal S2 and ATS2 is a pulse duration within this period TS2. The frequency of the second signal S2 is maintained at a constant value independently of the operating condition of the motor 5, i.e. independently of the frequency of the first signal. However, the pulse duration ATS2 of the second signal S2 can be pulse-width modulated, i.e. can be varied between 0 and TS2, as required. This serves to obtain time variations for the voltage vector U1, U2, U3, which is described in detail in the literature cited in the introductory part. For the sake of simplicity FIG. 2 only refers to a signal waveform with a constant ratio, i.e. duty cycle, between the pulse duration ATS2 and the period TS2.

In a manner known per se a pulse-width modulation circuit forms a signal vector having components P1, P2, P3 (in general up to Pn) from the said two signals S1 and S2, which components are shown as a function of time in FIGS. 2c), 2d) and 2e). By means of these signals P1, P2, P3 the branches 41, 42 and 43 of the power inverter 4 in FIG. 1 can be controlled in such a manner that the associated branch 41, 42 or 43 of the power inverter 4 connects the respective terminal 51, 52 or 53 of the load 5 connected to it to the first terminal 2 of the voltage source 1 when a high signal level occurs in one of the signals P1, P2 and P3 and to the second terminal 3 in the case of a low level of the signals P1, P2 and P3. Accordingly, the signal vector P1, P2, P3 can produce across the load 5 a voltage vector U1, U2, U3 corresponding to a three-phase system. In the present example the components P1, P2, P3 of the signal vector pulsate only at intervals in accordance with the shape of the second signal S2 but are constant in the other time intervals. For example, the first component P1 of the signal vector and hence the voltage U1 as the first component of the voltage vector across the load 5 has a constant value in the first time interval between the instants t0 and t1, pulsates in accordance with S2 in the time interval between t1 and t2, has a constant high value between t2 and t3, has a constant low value between t3 and t4, pulsates again between t4 and t5, and has again a constant low value between t5 and t6. In comparison with a continuously pulsating form this signal waveform has the advantage that the number of switching actions per unit of time is smaller, as a result of which smaller switching losses occur in the power inverter branches 41, 42, 43.

The time intervals in which the signals P1, . . . and, consequently, the voltages U1, . . . have constant values, which intervals are long in comparison with the period TS2 of the second signal S2, may be extended undesirably in the case of low revolution frequencies of the motor 5. It may then be desirable to change the value of the relevant component of the signal vector or voltage vector at least briefly within these time intervals. The operational or design reasons for this may be manifold; an example of this will be described hereinafter with reference to FIG. 3 and FIG. 4. This example, but also that of FIG. 2, is based on the case that at least one of the components of the voltage vector U1, . . . assumes the high value Uo beyond a given period of time within a time interval bounded by the instants t0 to t6. In accordance with the object of the invention said component of the voltage vector U1, . . . should then at least briefly assume the low value 0 at the latest after expiry of this given period of time, without the change of the voltage vector U1, . . . thereby leading to a change of the voltages between the terminals 51, 52, 53 of the load 5. FIG. 2i) shows the difference of the voltages U2 and U3 between the second terminal 52 and the third terminal 53 as an example for one of the voltages between the terminals 51, 52, 53 of the motor 5. It is apparent that an interruption of the signal waveform of P3 in FIG. 2e) in the time interval between t0 and t1 will lead to a change of the voltage waveform of FIG. 2i) in this area. However, such a change is undesirable.

In accordance with the invention, after expiry of the given period of time, which is designated ZSP in FIG. 2f), the next null vector of the voltage vector U1, . . . is inverted. This null vector, i.e. a state of the voltage vector U1, . . . in which all the components U1, . . . of the voltage vector assume the same value, will always occur in the time interval between the instants t0 and t1 if all the components U1, . . . of the voltage vector assume the high value. As in this time interval the component U3 also constantly has the high value Uo the null vector will appear with the high value Uo in each pulse of the voltage U2. After expiry of the given period of time ZSP this appearance will take place in the time interval Z1. By inverting this null vector all the components U1, . . . of the voltage vector are changed over to the low value 0 during the time interval Z1. In FIGS. 2f), 2g) and 2h) this is shown for the components U1, . . . of the voltage vector. As is apparent from FIG. 2i) this change-over does not mean a change for the voltages via the terminals 51, 52 and 53 of the load 5.

In the time interval between the instants t1 and t2 the components U2 and U3 of the voltage vector continuously assume the low value 0, while U1 is switched between the high value Uo and the low value 0 in accordance with the second signal S2. Thus, in this time interval a null vector is formed via the low voltage value 0 on the second terminal 3 of the voltage source 1 in time intervals which recur regularly with a repetition frequency corresponding to the frequency of the second signal S2. Since the spacing between these time intervals in which a null vector occurs is smaller than the given period of time ZSP, the null vector is not inverted between the instants t1 and t2.

The same applies to the time intervals between the instants t3 and t4 as well as t5 and t6. Conversely, in the time intervals between the instants t2 and t3 as well as t4 and t5 a constantly high value occurs in the components P1 and P2 and P2 and P3, respectively, for a longer time than the given period of time ZSP. As a consequence, the null vector is inverted again in these time intervals, i.e. in the time intervals marked Z2 and Z3 in FIG. 2.

The embodiment shown block-schematically in FIG. 3 is a power supply for a polyphase motor using the circuit arrangement in accordance with the invention. Items already described with reference to FIGS. 1 and 2 again bear the same reference symbols. A control circuit 6 is connected to a first signal source 8, which supplies the second signal S2 to the control circuit 6 via the first input 7. The first signal S1 is applied to the control circuit 6 via a second input 9. In a control stage 10 this first signal is derived from a nominal-value signal, which is representative of the desired speed of the motor 5 and which is applied to the control stage 10 via a nominal-value input 11, and from an actual-value signal, which is obtained from a rotational-position sensor 12 connected to the motor 5 and which is applied to the control stage 10 via an actual-value input 13. The duty cycle of the signal (7) applied to the control circuit (8) will also be varied depending on the desired motor speed (11) in accordance with the motor characteristic. The control circuit 6 is connected to the power inverter 4 via the power inverter control terminals 21, 22, . . . . . 2n. Each of the power inverter control terminals 21, 22, . . . , 2n is associated with one of the branches 41, 42, . . . , 4n of the power inverter 4, as is shown very schematically for a three-phase motor 5 in FIG. 1 and in detail for a general example in FIG. 4. The power inverter 4 shown in FIG. 4 includes in each of its branches 41, 42, . . . , 4n two load transistors 411, 421; 412, 422 . . . , 41n, 42n, respectively, having their main current paths arranged in series between the first terminal 2 and the second terminal 3 of the voltage source 1. The load transistors 411, 412 . . . form semiconductor switches for the power inverter 4, of which each time the first is arranged between the first terminal 2 of the voltage source 1 and the associated terminal 51, . . . of the load 5, and the second one between the terminal 51, . . . of the load 5 and the second terminal 3 of the voltage source 1. Each of the load transistors 411, 421, . . . has an associated driver circuit 431, 441; 432, 442, . . . 43n, 44n whose output is connected to the control terminal of the associated load transistor 411, 421, . . . . . The respective driver circuits 431, 441; 432, 442, . . . 43n, 44n of each of the branches 41, 42 . . . 4n each have their inputs connected to one another via a power inverter 451, 452, . . . . 45n dimensioned for high reverse voltages, the second driver circuits 441, 442 . . . 44n for the second load transistors 421, 422 . . . 42n having their inputs connected to the associated power inverter control terminals 21, 22 . . . 2n. The first driver circuits 431, 432 . . . 43n each have a first one of their supply voltage terminals 461, 462 . . . 46n connected to the associated terminal 51, 52 . . . 5n of the load 5. i.e. also to the node between the main current paths of the associated load transistors 411, 421; 412, 422 . . . 41n, 42n. Likewise, the second driver circuits 441, 442 . . . 44n each have their first supply voltage terminal 471, 472 . . . 47n connected to the second terminal 3 of the voltage source 1. Each second supply voltage terminal 491, 492, . . . 49n is connected to a first terminal 14 of a common driver supply voltage source 15, whose second terminal 16 is coupled to ground potential 0 together with the voltage source 1. Moreover, a diode 31, 32 . . . 3n in each branch 41, 42 . . . 4n of the power inverter 4 connects the first terminal 14 of the driver supply voltage source 15 to a second supply voltage terminal 481, 482 . . . 48n of the first driver circuit 431, 432 . . . 43n associated with the respective branch. The first and the second supply voltage terminal of each of the driver circuits 431, 432 . . . 43n are connected to one another via a respective supply capacitor 511, 521; 512, 522 . . . 51n, 52n. Thus, in the present embodiment not only the driver circuits 431, 441, . . . of a branch 41, . . . of the power inverter 4 but all the driver circuits receive their power supply from a common driver supply voltage source 15.

Figure 4:
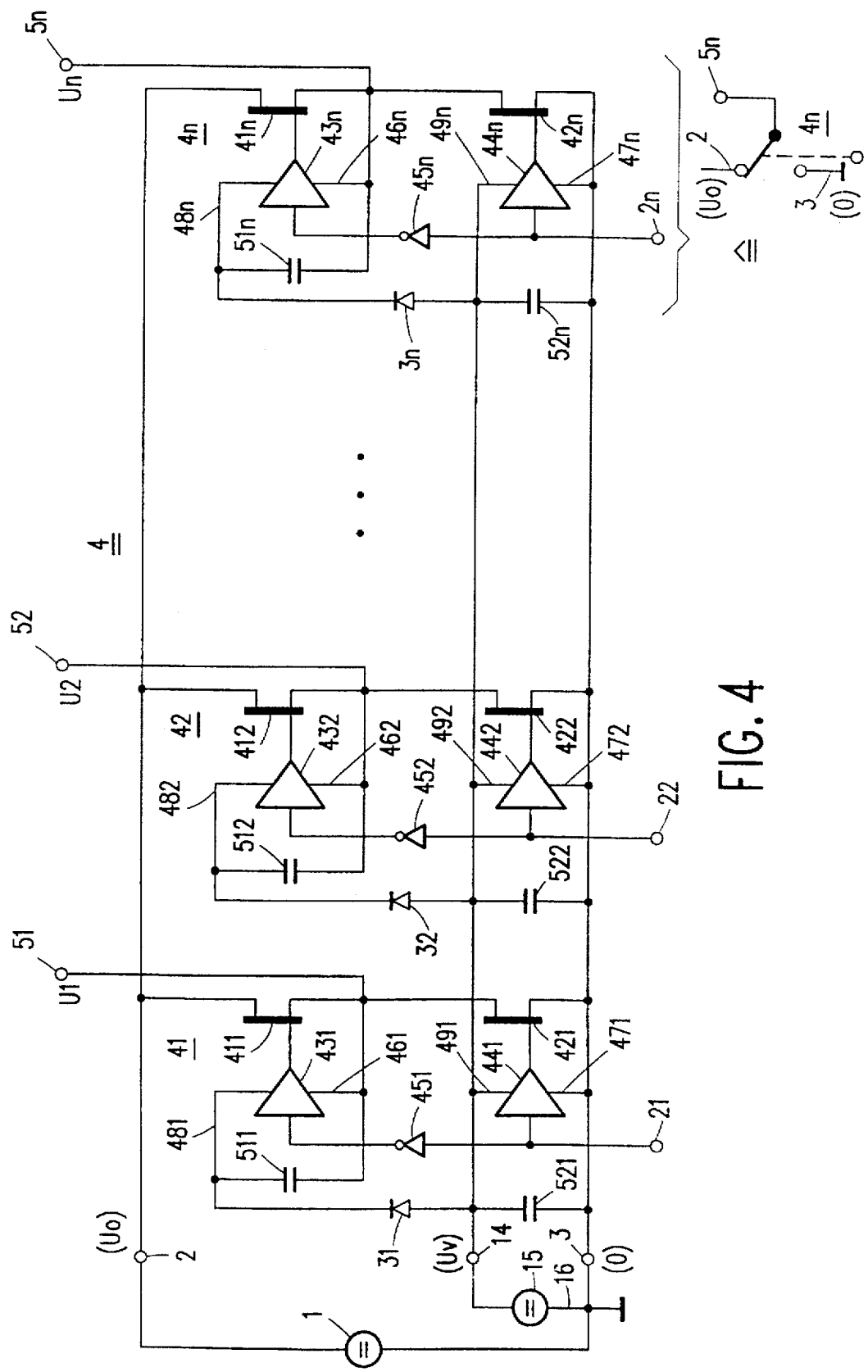
FIG. 4 shows in detail a power inverter for use with the invention.

In a practical version of the power inverter shown in FIG. 4 the driver circuits 431, 441, . . . of each of the branches 41, ... may be combined in a common, preferably integrated, device. All the driver circuits 431 require only one driver supply voltage source 15, which supplies a supply voltage Uv. This simplifies the power supply for the power inverter 4 considerably. In principle, the voltage Uv may be smaller than the voltage value Uo. In the intervals in which in a branch 41, ... of the power inverter 4 the first load transistor 411, ... conducts and, consequently, the second load transistor 421, ... is cut off, the associated diode 31, ... is also cut off and the first driver circuit 431, ... is isolated from the driver supply voltage source 15. The first driver circuit 431, ... is then powered by the connected supply capacitor 511, .... If the first load transistor 411, ... now remains continuously conductive beyond the given period of time ZSP and, as a result, the supply capacitor 511, ... is not recharged during this period of time ZSP, the supply voltage for the first driver circuit 431, ... may decrease below a permissible minimum value. It is then necessary to recharge the associated supply capacitor 511, ... For this purpose, the second load transistor 421 ... of the relevant branch 41, ... . of the power inverter 4 must be turned on and the associated first load transistor 411, ... must be turned off. The invention explained with reference to FIG. 2 guarantees this and also ensures that this switching operation has no effect on the load 5.

FIG. 4 shows the symbolic equivalent diagram of the second branch 4n of the power inverter 4 in order to illustrate the relationship with FIG. 1.

FIG. 3 shows an example of an embodiment for a circuit arrangement in accordance with the invention by means of which the signal waveforms shown in FIGS. 2f to 2h can be generated and which can be used in conjunction with the power inverter 4 shown in FIG. 4. The control circuit 6 shown in FIG. 3 comprises a pulse-width modulation circuit 17 which, in a manner known from the literature cited in the introductory part, which derives the signal vector P1, P2, . . . Pn shown in FIGS. 2c) to 2e) from the signals applied to it via the inputs 7 and 9 of the control circuit 6 and delivers it at signal outputs 171, 172, . . . , 17n. Each of the signal outputs 171, ... is connected to a first input 61, 62, ..... 6n of a respective Exclusive-Or gate 71, 72 ... 7n, whose output 81, 82 ... 8n is connected to the power inverter control terminal 21, 22 ... 2n of the branch 41, 42 ... 4n of the power inverter 4, to which the associated component P1, P2 ... Pn of the signal vector P1, ... Pn is to be applied. The Exclusive-Or gates 71, 72 ... 7n serve as inverters which can be controlled via their second inputs 91, 92 ... 9n. Depending on the signal applied via the second inputs 91, 92 ... 9n the signal vector P1, ... Pn is transferred in inverted or non-inverted form.

The signal outputs 171, . . . . 17n of the pulse-width modulation circuit 17 are also connected to inputs 181, 182 ... 18n of an OR gate 18 and to inputs 191, 192 ... 19n of an AND gate 19. At its output 180 the OR gate 18 produces a signal with information whether at least one of the components P1, ... of the signal vector has a high value. The output 180 of the OR gate 18 forms an enable input of a counter 100, to which the second signal S2 from the first input 7 of the control circuit 6 is applied via a clock input 101. The counter 100 counts the pulses of the second signal S2 as long as the enable input (or the output 180 of the OR gate 18) carries a signal indicating that at least one of the components of the signal vector P1, ... Pn has a high value. When a count N is reached, which corresponds to a number of periods TS2 forming the given period of time ZSP, the counter 100 supplies a signal of logic high level to a further input 20 of the AND gate 19 of the AND gate 19 via a decoder circuit 102. When the next null vector appears, which is formed via the high voltage value Uo on the first terminal 2 of the voltage source 1, i.e. when all the components P1, ... of the signal vector assume a high value, another signal of logic high level appears on the output 190 of the AND gate 19. This is applied to the second inputs 91, ... of the Exclusive-Or gate 71, upon which this gate inverts the applied null vector.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A circuit arrangement for powering a load having at least two terminals comprising at least two branches through which a corresponding one of the terminals of the load is switchably connected to a first or a second terminal of a voltage source so as to apply to the load a voltage vector having at least two components, each component assuming one of two values based on the voltage of the voltage source and a control circuit for setting the values of the components of the voltage vector wherein in response to all components assuming the same value during some portion of a given period of time so as to form a first null vector and at least one of the components of the voltage vector during this given period of time exclusively assuming this same value, all components are set by the control circuit to assume the other value so as to form a second null vector.

2. The circuit arrangement as claimed in claim 1, wherein at least one of the components of the voltage vector are temporarily pulse-width modulated as a function of time.

3. The circuit arrangement as claimed in claim 2, wherein the next null vector immediately follows in time the first null vector.

4. The circuit arrangement as claimed in claim 3, wherein the first vector is applied to the load in regularly recurring time intervals.

5. The circuit arrangement as claimed in claim 2, wherein the first vector is applied to the load in regularly recurring time intervals.

6. The circuit arrangement as claimed in claim 1, wherein the first terminal of the voltage source is substantially at a high voltage value as the first one of the two values of the components and the second terminal of the voltage source is substantially at ground potential as the second one of the two values of the components.

7. The circuit arrangement as claimed in claim 6, wherein each branch includes a first semiconductor switch disposed between the first terminal of the voltage source and the associated terminal of the load and a second semiconductor switch disposed between the associated terminal of the load and the second terminal of the voltage source and further including a first driver circuit for driving the first semiconductor switch and a second driver circuit for driving the second semiconductor switch and wherein the driver circuits for at least one branch are powered from a common drive supply voltage source which is connected through a diode to the first driver circuit and connected directly to the second driver circuit.

8. The circuit arrangement as claimed in claim 6, wherein the next null vector immediately follows in time the first null vector.

9. The circuit arrangement as claimed in claim 8, wherein the first vector is applied to the load in regularly recurring time intervals.

10. The circuit arrangement as claimed in claim 6, wherein the first vector is applied to the load in regularly recurring time intervals.

11. The circuit arrangement as claimed in claim 1, wherein the next null vector immediately follows in time the first null vector.

12. The circuit arrangement as claimed in claim 1, wherein the first vector is applied to the load in regularly recurring time intervals.

* * * * *